S. MILLER.
Car-Couplings.

No. 140,720.

Patented July 8, 1873.

Witnesses.
H. D. McNaughton
Henry M. Thomas

Inventor.
Spencer Miller,
pr R. F. Osgood,
atty.

UNITED STATES PATENT OFFICE.

SPENCER MILLER, OF HOLLEY, ASSIGNOR OF ONE-HALF HIS RIGHT TO HUDSON MILLER, OF BERGEN, NEW YORK.

IMPROVEMENT IN CAR-COUPLINGS.

Specification forming part of Letters Patent No. 140,720, dated July 8, 1873; application filed May 7, 1873.

*To all whom it may concern:*

Be it known that I, SPENCER MILLER, of Holley, in the county of Orleans and State of New York, have invented a certain new and useful Improvement in Car-Couplings; and I do hereby declare that the following is a full, clear, and exact description of the construction and operation of the same.

My invention consists in combining, with the draw-bars or shanks of a car-coupling, hook-heads which are pivoted or bolted to turn back out of the way when attaching the ordinary links, and which are constructed with projecting shoulders, which form bumpers, as hereinafter described.

Figure 1:
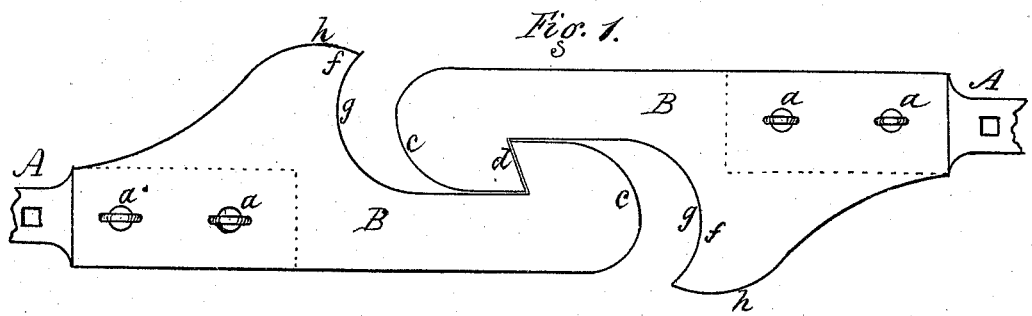
Figure 2:
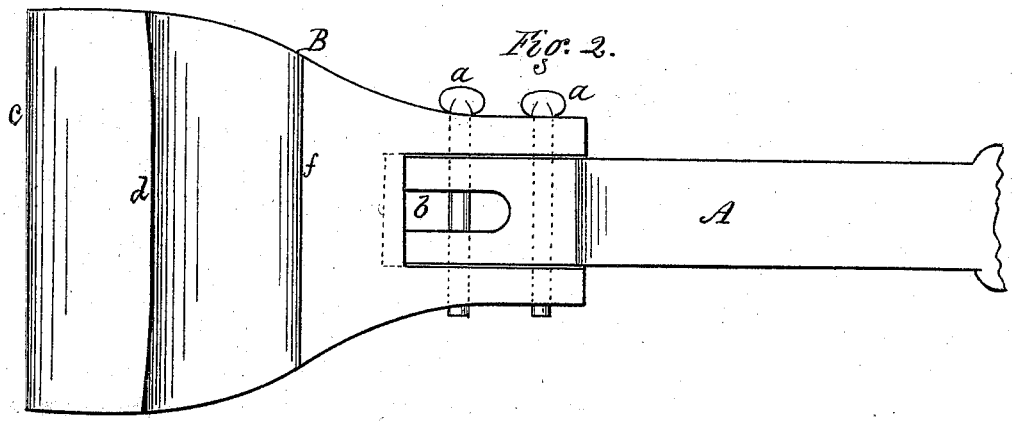
Figure 3:
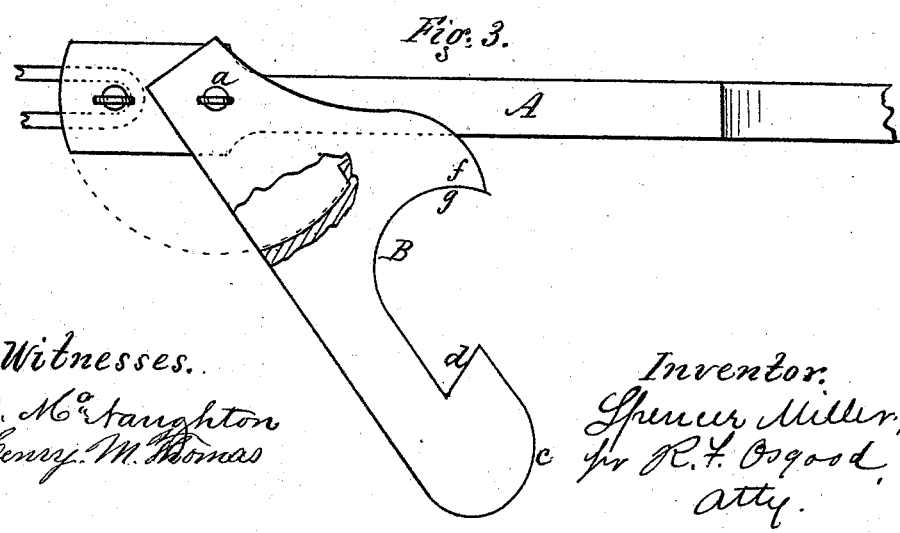

In the drawings, Figure 1 is a plan of the coupling; Fig. 2, an elevation of one-half of the coupling; Fig. 3, a plan, showing the hook-head turned back for the connection of the common link.

A A represent the two draw-bars, and B B the hook-heads attached to the ends of the same. The hook-heads stand vertically, as shown in Fig. 1, and engage by springing sidewise, springs being combined with the draw-bars at the sides in such a manner as to allow this motion. The hook-heads are made of considerable vertical length, so that they will couple at all times, even when cars of different heights are brought together.

Each hook-head is attached to the end of its bar by two bolts, *a a*, which make it stiff and fast on the bar. By removing one of the bolts the hook-head can be swung around on the other, out of the way, as shown in Fig. 3. This is for the purpose of connecting the common link in cars having the old form of coupling. For this purpose the end of the draw-bar, to which the hook-head is attached, is provided with a slot, *b*, Fig. 2, into which the link fits, and is secured by one of the bolts *a*.

The hook-heads are each provided with the angular end *c*, which guides the hooks in place, and also with the hook proper, *d*, which holds them together. In addition to these parts, each has, in the rear of the hook, a shoulder, *f*, with a concave face, *g*, which serves as a bumper for the opposite hook-head to strike against in coming together. The space between the bumper and the hook is sufficient to allow the opposite hook-head to engage, and the projection of the bumper laterally is equal to, or a little more than, the projection of the opposite hook-head, so that it will be sure to take the shock. I prefer to round the outer edge of the bumper, as shown at *h*. To break the shock when the parts come together I connect the draw-bars with suitable springs, which may resist strain in both directions.

By thus constructing the draw-bars the hook-heads may be turned back for the coupling of the ordinary links when desired, and the bumpers are combined with the hook-heads themselves, thereby dispensing with bumpers on the cars.

What I claim, and desire to secure by Letters Patent, is—

The hook-head B, having the hook *d* and bumper *f*, and attached to and combined with the draw-bar A, so as to be turned back for the connection of the ordinary link, as herein shown and described.

In witness whereof I have hereunto signed my name in the presence of two subscribing witnesses.

SPENCER MILLER.

Witnesses:
WILLARD MILLER,
B. J. PENIGO.